Sept. 29, 1970          H. KATZ          3,531,679
DISPENSER CATHODE, PARTICULARLY AN MK CATHODE
HAVING EXTENDED STORAGE LIFE
Filed Feb. 7, 1968
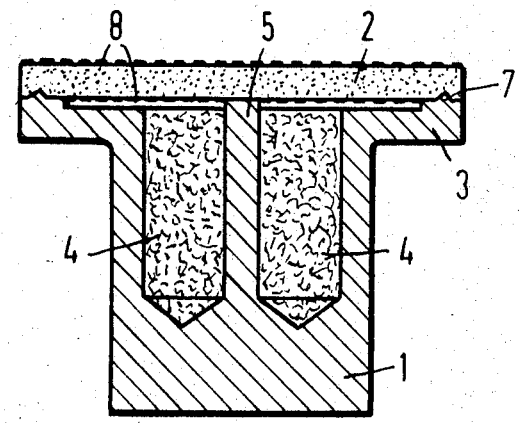
INVENTOR
Helmut Katz
BY          ATTYS.

3,531,679
DISPENSER CATHODE, PARTICULARLY AN MK CATHODE HAVING EXTENDED STORAGE LIFE
Helmut Katz, Munich, Germany, assignor to Siemens Aktiengesellschaft, Berlin and Munich, Germany, a corporation of Germany
Filed Feb. 7, 1968, Ser. No. 703,759
Claims priority, application Germany, Feb. 88, 1967, S 108,460; Oct. 27, 1967, S 112,589
Int. Cl. H01j 1/14, 19/06
U.S. Cl. 313—346     6 Claims

ABSTRACT OF THE DISCLOSURE

A storage cathode, particularly an MK cathode utilizing an emission-promoting supply covered by a porously sintered tungsten disk, in which the supply material comprises an earth alkali carbonate immune to moisture, particularly barium carbonate, in which the inner and outer active surfaces of the porous disk of tungsten is coated with a metal, particularly rhenium, which is relatively non-reactive with gases released during disintegration of the carbonate and which in the presence of a barium film yields practically the same work function as that of barium or tungsten.

BACKGROUND OF THE INVENTION

The invention is directed to a storage cathode, particularly an MK cathode, in which the supply consisting of an earth alkali carbonate which is immune to moisture, particularly barium carbonate, and is covered by a porously sintered tungsten disk.

The barium, customarily used as the emission-promoting substance, in the vast majority of cases is disposed in the supply container involved, as a supply substance, in the form of barium oxide. However this material has a serious disadvantage which leads to considerable difficulties in production as a result of it being highly hygroscopic. Thus, when moisture is present, barium oxide changes to barium hydroxide, which in turn results in most diverse disturbances. Consequently, at an early date barium carbonate was substituted as the supply substance in place of barium oxide. However, the utilization of barium carbonate also leads to disturbing phenomena, so that years ago a return from the use of barium carbonate to barium oxide became practically general. This was due on a large part to the fact that when converting barium carbonate to barium oxide, which conversion takes place at about 900° C., carbon dioxide is released, which at these temperatures oxidizes in particular the tungsten of the porous emission disks, whereby further reactions will cause emission problems.

The problem to which the invention is directed thus consists in perfecting a solution which makes it possible to use an alkali carbonate, especially barium carbonate, which is immune to moisture as a storage substance for a storage cathode, particularly MK cathodes, to thereby effect a simplification in the handling and storage of the materials in the technical production of the cathode, and in particular to substantially increase the storage stability of cathodes which have been manufactured but are to be subsequently installed and thus are to be placed in a store room during the interim period.

THE SUMMARY OF THE INVENTION

The desired results are accomplished in accordance with the invention in the production of a storage cathode, particularly an MK cathode in which the supply, covered by a porous tungsten disk, consists of earth alkali metal carbonate immune to moisture, particularly barium carbonate, by the provision of coating the inner and outer active surfaces of the porous emission material carrier disk of tungsten with at least one metal, particularly metals from the platinum group, which is relatively non-reactive with the gases released during the disintegration of the carbonate. The coating of the tungsten disk may be effected by utilization of coating techniques known in the art. A particularly advantageous metal for this purpose is rhenium.

BRIEF DESCRIPTION OF THE DRAWINGS

The figure of the drawing illustrates a vertical section through a storage cathode structure constructed in accordance with the present invention.

DETAILED DESCRIPTION OF THE INVENTION

In the practice of the invention it is particularly advantageous to employ a particular selection of the metal for the coating whereby, during operation, a work function is attained by the metal coating in coaction with barium which is not substantially reduced, but on the contrary approximately equal to that of barium on tungsten. For example, in travelling wave tubes it has been discovered that in the present status of the art coatings made for example from osmium are unsuitable for travelling wave tube utilization because the sharply concentrated ionic rays, during operation, lead to local disturbances by partial destruction of the osmium coat, thus producing varying work functions at the surface of the cathode. Consequently, such phenomena will not permit a trouble-free operation of, for example, such wave tubes. In view of this situation there should be selected for the coating of porous carrier disks such as here involved preferably a metal coating which results in practically the same work function with barium as the latter with tungsten, but which is substantially immune to harmful gases produced during the disintegration of the carbonate, whereby there will be no reaction with such gases. Rhenium represents a particularly appropriate metal for this application, and in comparison, for example, with platinum, rhenium offers the advantage that it can be separated even in a sufficiently thick layer, free of residues by utilization of a chemical reduction method. Furthermore, rhenium produces practically precisely the same work function for an MK cathode, as cathodes with only a tungsten disk without an additional coating, and even over a wider temperature range. For example, the work function in MK cathodes with only tungsten is 2.028 electron volts at a pyrometric temperature 1100° C., while in a cathode treated with rhenium the work function is 2.030 electron volts. At 930° C. the untreated cathodes have a work function of 1.95 electron volts, while those treated with rhenium have work function of 1.945 electron volts. These practically identical work functions thus permit, with particular advantage, a wide dispersion range in the thickness of the rhenium to be applied. For example, it is therefore immaterial how long the rhenium coating involved is preserved in subsequent operation as the work function is not related to its presence or disappearance. Moreover, the chemical resistance of rhenium is so high with respect to the disintegration products produced that for practical purposes rhenium can be regarded as a precious metal.

Referring to the drawing, in which the embodiment of the invention therein illustrated is clearly schematically disclosed, the reference numeral 1 designates a generally mushroom-shaped cathode carrier having a generally cylindrically shaped body portion which terminates at its upper end, forming the frontal side of the structure, in a relatively broad flange 3 upon which mounted the porous emission substance carrier 2. The central part of the cathode carrier or body is provided with a plurality of bores 4 therein. For example four such bores, which preferably are of identical size and form compartments for the storage of the supply of emission-promoting substance. The dividing wall portion 5 extends to the inner face of the porous carrier 2 and forms a supporting member or bridge for the porous carrier, to which the latter may be secured. The porous carrier disk 2 functions as the sealing means for the storage container and may be secured, by suitable means such as electrical welding, to the outer face of the flange 3 which may be provided with a suitable profile 7 to facilitate such welding. As illustrated in the drawing, the portion of the flange 3 adjacent the bores 4 and the inner face of the disk 2 may be undercut to facilitate effective distribution of the emission substance over the face of the disk 2 during operation.

The inner and outer active surfaces of the porous carrier disk 2 are provided with a very thin coating 8 of a metal which does not materially react with the gases released during disintegration of the carbonate and which in the presence of a barium film preferably yields practically the same work function as that resulting in the case of barium on tungsten. As previously pointed out rhenium possesses particularly suitable characteristics in this respect. While I therefore prefer to use rhenium for the metal coating, other metals of the platinum group may be employed with improved results over the use of uncoated tungsten disks.

Changes may be made within the scope and spirit of the appended claims which define what is believed to be new and desired to have protected by Letters Patent.

I claim:

1. A dispenser cathode, particularly an MK cathode, wherein the supply consists of an earth alkali carbonate immune to moisture, and is covered by a porously sintered tungsten disk, characterized by the fact that the inner and outer active surfaces of such porous disk of tungsten forming the carrier disk for the emission material, is coated with such a metal which does not materially react with gases released during disintegration of the carbonate.

2. A storage cathode according to claim 1, wherein the earth alkali carbonate is barium carbonate and the metal coating of the porous tungsten disk comprises a metal which, in addition with barium, produces approximately the same work function as that of barium on tungsten.

3. A storage cathode according to claim 2, wherein the metal coating of the porous tungsten disk for obtaining such a work function consists of rhenium metal.

4. In a metal capillary dispenser cathode having a hollow body portion for receiving an emission supply substance and a porous sintered tungsten disk covering said hollow body portion and having a metal coating on the exterior surface thereof to lower the work function of the cathode, the improvement therein comprising the provision of an earth alkali carbonate as said emission supply substance, said alkali carbonate producing carbon dioxide upon decomposition thereof, and the provision of an additional metal coating on the inner surface of said tungsten disk adjacent said supply substance, said additional metal coating being relatively non-reactive with the carbon dioxide produced from said supply substance and favorably combined with the metal of said earth alkali carbonate to lower the work function of said tungsten disk.

5. In a dispenser cathode, as claimed in claim 4, wherein said earth alkali carbonate comprises barium carbonate, and said additional metal coating in combination with the barium of said barium carbonate produces approximately the same work function as that of barium on tungsten.

6. In a dispenser cathode, as claimed in claim 5, wherein said additional metal coating is rhenium.

References Cited

UNITED STATES PATENTS

| | | | |
|---|---|---|---|
| 2,750,527 | 6/1956 | Katz | 313—346 |
| 3,155,864 | 11/1964 | Coppola | 313—346 |
| 3,290,543 | 12/1966 | Weissman | 313—346 |
| 3,373,307 | 3/1968 | Zalm et al. | 313—346 |
| 3,382,397 | 5/1968 | Zalm | 313—346 X |

FOREIGN PATENTS 1,033,443  6/1966  Great Britain.

JOHN W. HUCKERT, Primary Examiner

A. J. JAMES, Assistant Examiner

U.S. Cl. X.R.

313—311